United States Patent
Zhou et al.

(10) Patent No.: US 12,293,184 B1
(45) Date of Patent: May 6, 2025

(54) ILLEGAL ADDRESS MASK METHOD AND DEVICE FOR CORES OF DSP

(71) Applicant: Jiangsu Huachuang Microsystem Company Limited, Nanjing (CN)

(72) Inventors: Haibin Zhou, Nanjing (CN); Guoqiang He, Nanjing (CN); Wenjun Han, Nanjing (CN); Ming Hao, Nanjing (CN)

(73) Assignee: Jiangsu Huachuang Microsystem Company Limited, Nanjing (CN)

( * ) Notice: Subject to any disclaimer, the term of this patent is extended or adjusted under 35 U.S.C. 154(b) by 0 days.

(21) Appl. No.: 19/002,787

(22) Filed: Dec. 27, 2024

(30) Foreign Application Priority Data

Dec. 27, 2023 (CN) .......................... 202311821091.0

(51) Int. Cl.
*G06F 9/30* (2018.01)
*G06F 9/32* (2018.01)

(52) U.S. Cl.
CPC ...... *G06F 9/30038* (2023.08); *G06F 9/30145* (2013.01); *G06F 9/324* (2013.01)

(58) Field of Classification Search
None
See application file for complete search history.

(56) References Cited

U.S. PATENT DOCUMENTS

| | | | | |
|---|---|---|---|---|
| 6,047,388 A * | 4/2000 | Bashore | ............ | G06F 12/1441 714/53 |
| 10,503,511 B2 * | 12/2019 | Mizuno | ............ | G06F 9/3802 |
| 2003/0191876 A1 * | 10/2003 | Fallon | ............ | G06F 9/4406 710/68 |
| 2005/0160210 A1 * | 7/2005 | Watt | ............ | G06F 9/4812 710/269 |
| 2005/0246502 A1 * | 11/2005 | Joshi | ............ | G06F 12/1441 711/147 |
| 2009/0168848 A1 * | 7/2009 | Constantinidis | ....... | H04B 1/707 375/140 |
| 2009/0292857 A1 * | 11/2009 | Tanabe | ............ | G06F 12/0891 711/3 |
| 2017/0003913 A1 * | 1/2017 | Gschwind | ........... | G06F 11/0793 |
| 2018/0165215 A1 * | 6/2018 | Kumar | ............ | G06F 9/30047 |
| 2019/0018710 A1 * | 1/2019 | Ambardekar | ....... | G06F 9/45558 |

* cited by examiner

*Primary Examiner* — Eric Coleman

(74) *Attorney, Agent, or Firm* — Bayramoglu Law Offices LLC

(57) ABSTRACT

An illegal address mask method for cores of a DSP includes: S1, initializing a core of a DSP; S2, configuring a start address register and an end address register, and taking an address range defined by the start address register and the end address register as a masked address range; configuring a first comparator and a second comparator to send out illegal address decision signals for instructions within the masked address range; S3, acquiring a PC pointer, and determining whether the PC pointer is located in the masked address range; if so, sending out an illegal address decision signal to stop an operation; if not, performing pre-decoding to obtain a memory access instruction; and S4, determining whether an address of the memory access instruction is located in the masked address range; if so, sending out an illegal address decision signal to stop an operation; otherwise, completing a memory access operation.

9 Claims, 2 Drawing Sheets

ILLEGAL ADDRESS MASK METHOD AND DEVICE FOR CORES OF DSP

CROSS REFERENCE TO THE RELATED APPLICATIONS

This application is based upon and claims priority to Chinese Patent Application No. 202311821091.0, filed on Dec. 27, 2023, the entire contents of which are incorporated herein by reference.

TECHNICAL FIELD

The invention relates to the field of digital signal processors (DSPs), in particular to an illegal address mask method and device for cores of a DSP.

BACKGROUND

A DSP, as a unique microprocessor, can quickly implement various digital signal processing algorithms and is widely applied to various scenarios. In the DSP, multiple cores are connected to a slave device generally by means of an AXI bus. As required by the AXI bus protocol, when a main device of the core of the DSP accesses the external slave device (including a read operation and a write operation) by means of the AXI, the external slave device needs to return a feedback signal indicating the completion of one read/write access. However, in a case where a fault happens to the slave device and an address space has been mapped to the slave device or a non-mapped reserved address space in the processor is read/written by the main device, the core of the DSP will not receive a feedback signal.

In the prior art, one method for solving the problem of no response for the core of the DSP is to adopt a timeout soft reset mechanism to set a timeout clock period, that is, if a bus operation is not completed within a set AXI clock period, the bus will be considered as deadlocked; then, an interrupt request is sent to an interrupt controller in time, and information of the bus operation resulting in the deadlock is written into a group of registers. Another method for solving the problem of no response is to add a dummy slave device in the bus to generate a virtual response to solve the problem of no response caused by invisibility or faults of the slave device. This method also needs a timeout determination process; however, when no response is given in a set time, neither an interrupt nor soft reset will be generated, the dummy slave device simulates a response signal emitted by the true slave device to satisfy transmission mechanism requirements of AXI.

However, the two methods both require the timeout determination process, thus prolonging the system response time and failing to satisfy the requirement for high real-time performance of systems; in addition, although the problem of no response is solved, an invalid instruction will still perform a subsequent operation at an incorrect position according to the process of an instruction pipeline, leading to invalid operations of instructions, increasing unnecessary overhead for access to the instruction pipeline and bus transmission, and reducing transmission efficiency.

SUMMARY

The objective of the invention is to provide an illegal address mask method and device for cores of a DSP, which masks illegal addresses respectively at a fetch stage and a pre-decode stage by means of an illegal address mask register group to solve the problem of no response. The technical issue to be settled by the invention is how to quickly mask false instructions and avoid invalid operations of instructions in a case where no response is given, so as to maintain the high real-time performance of a system, reduce transmission overhead and improve transmission efficiency.

The technical solution adopted by the invention is as follows:

On the one hand, the invention provides an illegal address mask method for cores of a DSP, including the following steps:

S1, initializing a core of a DSP, including: powering on and resetting the core of the DSP;

S2, configuring, in the core of the DSP, a group of illegal address mask registers, including a start address register and an end address register, and taking an address range defined by the start address register and the end address register as a masked address range; configuring, in the core of the DSP, a first comparator and a second comparator, which are configured to send out illegal address decision signals for instructions within the masked address range; configuring, in the core of the DSP, a first gate and a second gate, which are configured to block or transmit instructions;

S3, acquiring a PC pointer by means of a program counter (PC) or a jump instruction, and determining, by the first comparator in S2, whether an address of the PC pointer is located in the masked address range; if so, sending out an illegal address decision signal by the first comparator to control the first gate to block the PC pointer so as to stop an operation of the PC pointer, such that an illegal address is masked; if not, controlling the first gate to transmit the PC pointer to perform pre-decoding, wherein the pre-decoding includes: fetching instructions from a program memory by means of the PC pointer, and transmitting the fetched instructions to an instruction pre-decoder for pre-decoding to obtain an address of a memory access instruction; and S4, determining, by the second comparator in S2, whether the address of the memory access instruction obtained in S3 is located in the masked address range; if so, sending out an illegal address decision signal by the second comparator to control the second gate to block the memory access instruction so as to stop an operation of the memory access instruction, such that an illegal address is masked; if not, controlling the second gate to transmit the memory access instruction to perform decoding, and completing a memory access operation according to an instruction obtained by decoding.

The group of illegal address mask registers can effectively mask no-response instructions, and illegal address determination is performed at a fetch stage and a decode stage, such that the negative influence of the no-response instructions can be eliminated as soon as possible, thus reducing subsequent transmission overhead.

Preferably, the DSP includes one core or multiple cores; in a case where the DSP includes one core, the core is processed according to S1-S4; or, in a case where the DSP includes multiple cores, all the cores are synchronously processed according to S1-S4. Considering that the number of cores of the DSP is not fixed, mask determination is performed twice for each core to effectively guarantee the overall transmission efficiency.

Preferably, the case where the DSP includes multiple cores, if the cores perform identical tasks, identical masked address ranges are set in the cores; or, if the cores perform different tasks, different masked address ranges are set in the cores. Considering that the cores of the DSP may perform identical tasks or different tasks and external instructions received by the cores may be different, a corresponding masked address range is set for each core to ensure that each core can accurately complete its task.

Preferably, in S2, the masked address range includes non-mapped reversed addresses in the core, and addresses, that have been mapped and not used, corresponding to a salve device in the core. Non-mapped reserved address and addresses, that have been mapped and not used, corresponding to a slave device in the core will lead to the problem of no response, so a masked address range including these two types of addresses is set to effectively mask illegal addresses, thus improving transmission efficiency.

Preferably, In S2, a method for configuring a group of illegal address mask registers includes: configuring, in the core of the DSP, two control and status registers (CSRs) as reserved items, and modifying the two CSRs into the start address register and the end address register respectively when a group of illegal address mask registers needs to be configured. The CSRs as reserved items can be extended into illegal address mask registers to handle interrupts and exceptions to mask illegal addresses.

Preferably, in S3, when instructions are fetched from the program memory by means of the PC pointer, the number of the instructions fetched from the program memory is equal to a maximum number of instructions decoded by the core within one clock period. The number of instructions fetched by the fetch operation is set to be the maximum number of instructions decoded by the core within one clock period, such that the fetch operation can be completed as quickly as possible; and particularly, in a case where a large quantity of data needs to be processed multiple times, if the maximum number of instructions are fetched every time, the operating efficiency can be maximized.

On the other hand, the invention provides an illegal address mask device for cores of a DSP, including:

a signal input module, including a first multiplexer, a PC, a second multiplexer and a controller unit, wherein the first multiplexer receives an external input instruction and a first jump instruction from the control unit and selects an appropriate transmission path to transmit the external input instruction and the first jump instruction to the PC to obtain a PC pointer, and the second multiplexer receives the PC pointer and a second jump instruction from the control unit and selects an appropriate transmission path to transmit the PC pointer and the second jump instruction;

an illegal address determination module, including a first comparator, a first gate, a program memory, an instruction pre-decoder, an illegal address mask register group, a second comparator and a second gate, wherein the first comparator receives an instruction transmitted by the second multiplexer of the signal input module and compares the instruction with a masked address range in the illegal address mask register group; when the instruction transmitted by the second multiplexer is located in the masked address range, the first comparator sends out an illegal address decision signal to inform the first gate to block the instruction; when the instruction transmitted by the second multiplexer is not located in the masked address range, the first gate transmits the instruction to drive the PC pointer to perform a fetch operation on the program memory; the instruction pre-decoder receives and pre-decodes instructions obtained by the fetch operation to obtain an address of a memory access instruction; whether the address of the memory access instruction is located in the masked address range is determined by the second comparator; if so, the second comparator sends out an illegal address decision signal to control the second gate to block the memory access instruction; if not, the second gate transmits the memory access instruction; and a decoding and execution module, including an instruction decoder, an instruction execution unit and an external interface, wherein the instruction decoder receives the memory access instruction transmitted by the second gate of the illegal address determination module, extracts contents of the memory access instruction, transmits the contents of the memory access instruction to the instruction execution unit to perform a memory access operation, and after the memory access operation is completed, output is performed by means of the external interface.

Reception and jumping, illegal address mask, and decoding and execution of instructions are implemented by means of three modules, such that the illegal address mask device effectively eliminates the influence of illegal addresses on transmission in a case where no response is given, and avoids invalid operations possibly caused by instructions corresponding to the illegal addresses before a fetch, thus reducing transmission overhead and improving transmission efficiency.

Preferably, the DSP includes one core or multiple cores; in a case where the DSP includes one core, the core is set according to the signal input module, the illegal address determination module, and the decoding and execution module of the illegal address mask device for cores of a DSP; or in a case where the DSP includes multiple cores, each of the cores is set according to the signal input module, the illegal address determination module, and the decoding and execution module of the illegal address mask device for cores of a DSP. The same modules are configured for each core, such that each core can timely mask illegal addresses, thus guaranteeing the transmission efficiency and accuracy of each core and also guaranteeing the transmission efficiency and accuracy of the whole DSP.

Preferably, the illegal address mask register group in the illegal address determination module includes a start address register and an end address register which are extended from two CSRs, and an address range defined by the start address register and the end address register is the masked address range. CSRs are extended into the illegal address mask register group, such that exceptions and interrupts can be effectively handled in a case of no response, and illegal addresses can be masked timely, thus guaranteeing transmission efficiency.

Compared with the prior art, the invention has the following beneficial effects:

The illegal address mask register group is used to perform illegal address determinations respectively before the fetch operation and at the pre-decode stage, such that an illegal address can be quickly masked in a case of no response, a subsequent operation of an invalid instruction corresponding to the illegal address is eliminated, and invalid operations caused by the invalid instruction are avoided; in addition, timeout determination is not needed, such that the system response time will not be prolonged, and the requirement for high real-time performance of a system is satisfied.

DETAILED DESCRIPTION OF THE EMBODIMENTS

The technical solutions in some embodiments of the invention are described in detail below in conjunction with drawings of these embodiments. Obviously, the embodiments in the following description are merely illustrative ones, and are not all possible ones of the invention. All other embodiments obtained by those ordinarily skilled in the art based on the following ones without creative labor should also fall within the protection scope of the invention.

Embodiment 1

Figure 1:
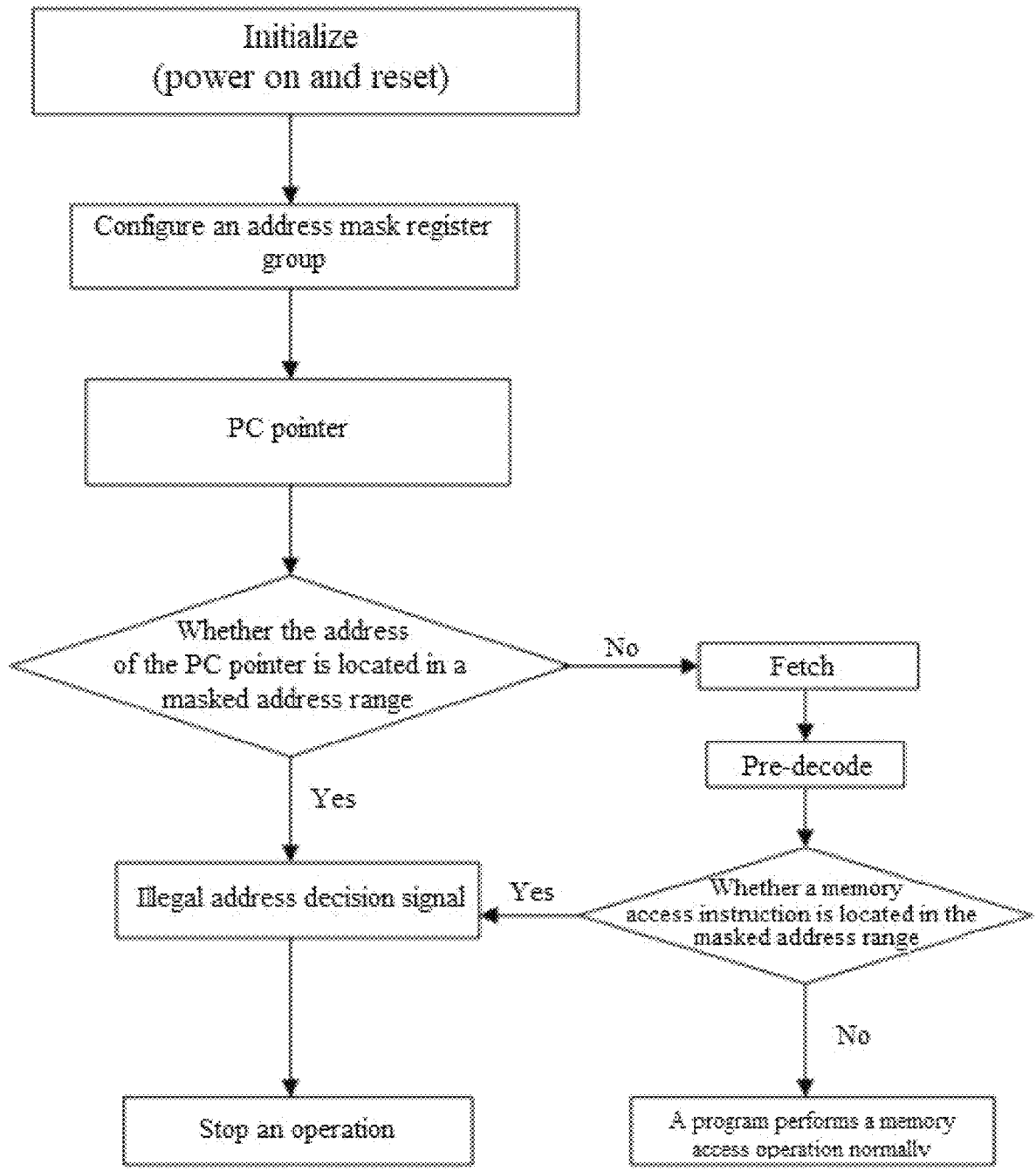
FIG. 1 is a flow diagram of an illegal address mask method for cores of a DSP according to one embodiment of the invention.

As shown in FIG. 1 which is a flow diagram of an illegal address mask method for cores of a DSP, an address mask register group is configured in the core, such that when the core runs after being initialized, a PC pointer and a memory access instruction obtained by pre-decoding can be compared with a masked address range to timely avoid the influence of illegal addresses on subsequent transmission.

As shown in FIG. 1, an illegal address mask method for cores of a DSP includes the following steps:
  S1, initializing a core of a DSP, including: powering on and resetting the core of the DSP. In an initialization process, a core is powered on, then a uboot program is used for initial development, and power-on defaults of registers in the core are set to 0 and are used as initialization values to ensure that values stored in the registers are known and avoid an undefined or uncertain state; and the core is reset to switch all parts to the initial state, such that all the parts can start to operate normally from a certain state.
  S2, configuring, in the core of the DSP, a group of illegal address mask registers, including a start address register and an end address register, and taking an address range defined by the start address register and the end address register as a masked address range; configuring, in the core of the DSP, a first comparator and a second comparator, which are configured to send out illegal address decision signals for instructions within the masked address range; configuring, in the core of the DSP, a first gate and a second gate, which are configured to block or transmit instructions.

A masked address range includes non-mapped reserved addresses in the core, addresses, that have been mapped and not used, corresponding to a slave device in the core, and addresses other than a flash boot space and a DDR4. The non-mapped reserved addresses correspond to common branch prediction adopted by the DSP, and a false prediction may lead to a failure to response of the slave device, so the non-mapped reserved addresses are illegal addresses to be masked. The addresses, that have been mapped and not used, corresponding to the slave device indicate a situation where the slave device does not exist in actual application or cannot operate normally due to a fault, and when a main device accesses a DDR space, the slave device will not respond, so these addresses are also illegal addresses.

To configure a group of illegal address mask registers, two registers used as reserved items need to be modified into a start address register and an end address register. Control and status registers (CSRs), as special registers for control and status management, can control the function and status in the processor and handle exceptions and interrupts, and are extendable, so CSRs can be used as the reserved items, and the two CSRs are extended into the start address register and the end address register respectively.

In addition, when the illegal address mask registers are configured, interrupt enable registers (IERs) may be configured in the core and then extended into the address mask registers; or, address mask registers (AMRs) may be directly configured to mask illegal addresses.

S3, acquiring a PC pointer by means of a program counter (PC) or a jump instruction, and determining, by the first comparator in S2, whether an address of the PC pointer is located in the masked address range; if so, sending out an illegal address decision signal by the first comparator to control the first gate to block the PC pointer so as to stop an operation of the PC pointer, such that an illegal address is masked; if not, controlling the first gate to transmit the PC pointer to perform pre-decoding, wherein the pre-decoding includes: fetching instructions from a program memory by means of the PC pointer, and transmitting the fetched instructions to an instruction pre-decoder for pre-decoding to obtain an address of a memory access instruction.

A program counter (PC) is used to obtain a PC pointer to perform instructions one by one in a case where the instructions need to be executed in sequence, such that instruction execution is simple and efficient; or, a jump instruction is used to obtain the PC pointer to allow a program to directly jump to a specified address to execute an instruction, and instructions do not need to be executed in sequence, such that instruction execution is more flexible, but the size and complexity of codes will be increased to some extent, reducing the performance of the program. Therefore, the PC pointer can be obtained by the corresponding method according to actual requirements and application scenarios. When instructions need to be executed in a skipped manner, a control unit in the core sends out a jump instruction. When instructions need to be executed in sequence, the PC is used to execute the instructions sequentially. In addition, it should be noted that instructions corresponding to the PC pointer may include multiple branch instructions, branch jump instructions, and offsets of the branch jump instructions, which will change according to the actual circumstance.

In this embodiment, two gates are used to control on/off of instruction transmission, a first gate controls on/off of instruction transmission according to a comparison result of a first comparator, and a second gate controls on/off of instruction transmission according to a comparison result of a second comparator; the two gates may be of the same specification or different specifications, the two comparators may be of the same specification or different specifications, and the specific specification of the comparator and the gates is not limited as long as the comparators and the gates can complete instruction comparison and on/off of instruction transmission.

S4, determining, by the second comparator in S2, whether the address of the memory access instruction obtained in S3 is located in the masked address range; if so, sending out an illegal address decision signal by the second comparator to control the second gate to block the memory access instruction so as to stop an operation of the memory access instruction, such that an illegal address is masked; if not, controlling the second gate to transmit the memory access instruction to perform decoding, and completing a memory access operation according to an instruction obtained by decoding.

The group of illegal address mask registers can effectively mask no-response instructions, and illegal address determination is performed at a fetch stage and a decode stage, such that the negative influence of the no-response instructions can be eliminated as soon as possible, thus reducing subsequent transmission overhead and guaranteeing transmission efficiency.

In this embodiment, in S3, when the PC pointer is used to fetch instructions from the program memory, the number of the instructions fetched from the program memory is equal to a maximum number of instructions decoded by the core in one clock period. The number of instructions fetched from the program memory is set to be the maximum number of instructions decoded by the core within one clock period, such that the fetch operation can be completed as quickly as possible; and particularly, in a case where a large quantity of data needs to be processed multiple times, if the maximum number of instructions are fetched every time, the operating efficiency can be maximized. For example, if an HC464v processor decodes four instructions, dispatches four instructions and transmits eight instructions in one tick, the number of instructions fetched in one clock period is four.

In this embodiment, the DSP includes one core or multiple cores; in a case where the DSP includes one core, the core is processed according to S1-S4; or, in a case where the DSP includes multiple cores, all the cores are synchronously processed according to S1-S4. The number of cores of the DSP is not fixed, so mask determination is performed twice for each core to effectively guarantee the transmission efficiency of each core and the transmission efficiency of the whole DSP.

In this embodiment, the case where the DSP includes multiple cores, if the cores perform identical tasks, identical masked address ranges are set in the cores; or, if the cores perform different tasks, different masked address ranges are set in the cores. Each core of the DSP is connected to an external salve device by means of a bus, the cores may perform identical tasks or different tasks, and external instructions received by the cores may be different, so a corresponding masked address range is set in each core to ensure that each core can mask illegal addresses under the condition of accurately completing its task, and invalid operations caused by instructions in the cores and interaction between the instructions are avoided, thus preventing the transmission efficiency from being reduced.

Embodiment 2

Figure 2:
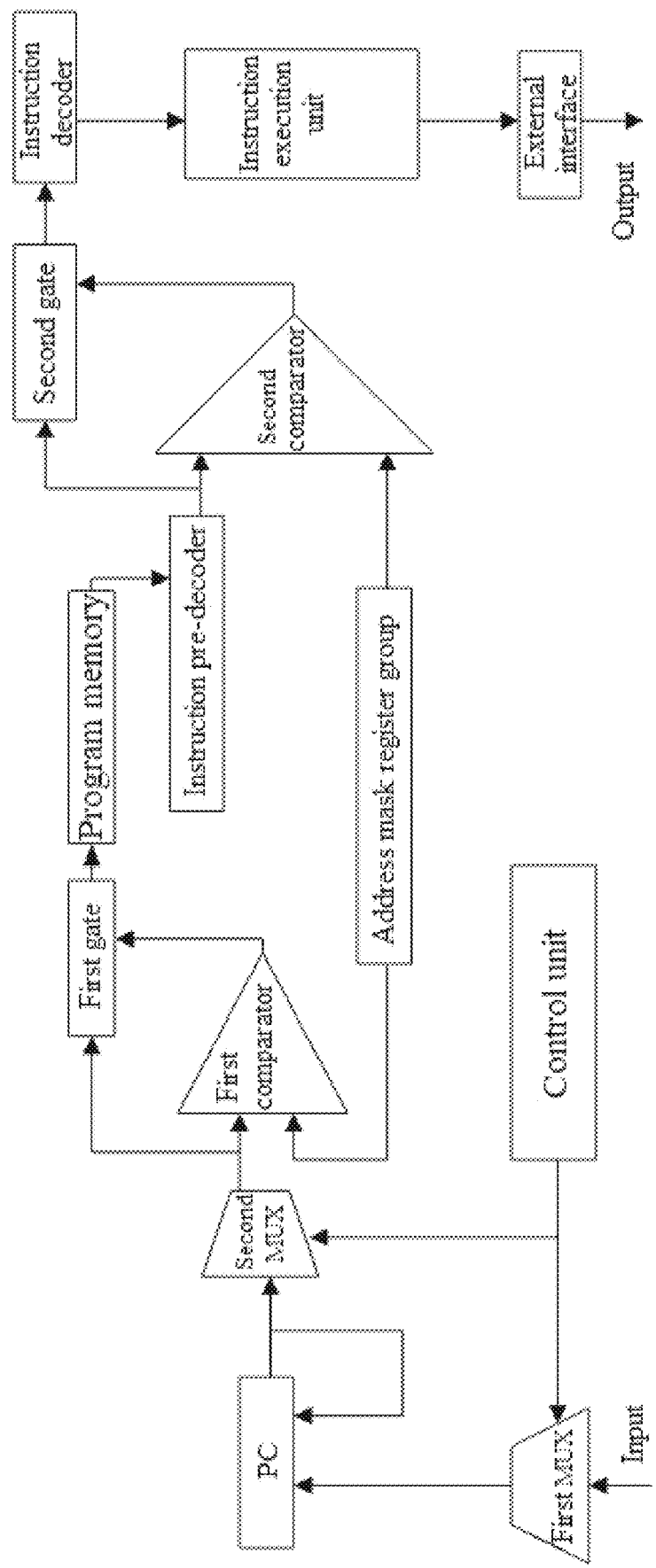
FIG. 2 is a schematic diagram of an illegal address mask device for cores of a DSP according to one embodiment of the application.

As shown in FIG. 2, the invention provides an illegal address mask device for cores of a DSP, including:
a signal input module, including a first multiplexer, a PC, a second multiplexer and a controller unit, wherein the first multiplexer receives an external input instruction and a first jump instruction from the control unit and selects an appropriate transmission path to transmit the external input instruction and the first jump instruction to the PC to obtain a PC pointer, and the second multiplexer receives the PC pointer and a second jump instruction from the control unit and selects an appropriate transmission path to transmit the PC pointer and the second jump instruction;
an illegal address determination module, including a first comparator, a first gate, a program memory, an instruction pre-decoder, an illegal address mask register group, a second comparator and a second gate, wherein the first comparator receives an instruction transmitted by the second multiplexer of the signal input module and compares the instruction with a masked address range in the illegal address mask register group; when the instruction transmitted by the second multiplexer is located in the masked address range, the first comparator sends out an illegal address decision signal to inform the first gate to block the instruction; when the instruction transmitted by the second multiplexer is not located in the masked address range, the first gate transmits the instruction to drive the PC pointer to perform a fetch operation on the program memory; the instruction pre-decoder receives and pre-decodes instructions obtained by the fetch operation to obtain an address of a memory access instruction; whether the address of the memory access instruction is located in the masked address range is determined by the second comparator; if so, the second comparator sends out an illegal address decision signal to control the second gate to block the memory access instruction; if not, the second gate transmits the memory access instruction; and
a decoding and execution module, including an instruction decoder, an instruction execution unit and an external interface, wherein the instruction decoder receives the memory access instruction transmitted by the second gate of the illegal address determination module, extracts contents of the memory access instruction, transmits the contents of the memory access instruction to the instruction execution unit to perform a memory access operation, and after the memory access operation is completed, output is performed by means of the external interface.

It should be noted that the technical effects of the device can be understood with reference to the description of the illegal address mask method for cores of a DSP, and will not be repeated here.

In this embodiment, the DSP includes one core or multiple cores; in a case where the DSP includes one core, the core is set according to the signal input module, the illegal address determination module, and the decoding and execution module of the illegal address mask device for cores of a DSP; or in a case where the DSP includes multiple cores, each of the cores is set according to the signal input module, the illegal address determination module, and the decoding and execution module of the illegal address mask device for cores of a DSP. The same modules are configured for each module, such that each core can timely mask illegal addresses, thus guaranteeing the transmission efficiency and accuracy of each core and also guaranteeing the transmission efficiency and accuracy of the whole DSP.

In this embodiment, the illegal address mask register group in the illegal address determination module includes a start address register and an end address register which are extended from two CSRs, and an address range defined by the start address register and the end address register is the masked address range. The CSRs are extended to form the illegal address mask register group, such that exceptions and interrupts can be handled effectively in a case of no response, and illegal addresses can be masked timely, thus guaranteeing transmission efficiency.

Specific Application Example

An instruction pipeline of a core of an HC464v DSP includes a fetch operation, a pre-decode operation, a decode operation, a dispatch operation, an issue operation, an execute operation, a write-back operation, and the like. The processor adopts a superscalar processor structure based on dynamic scheduling, and the core of the processor supports multi-issue and disordered execution of instructions, and can decode four instructions, dispatch four instructions and transmit eight instructions in one tick.

The HC464v processor is a RISC processor adopting a Load-Store register structure, only Load and Store (both scalar and vector) instructions have the right to access a memory, and the Load and Store instructions may be equivalent to memory access instructions. Multiple CSRs are configured in the core as reserved items and are extendable, contents in the registers can be defined by users by means of reserved private extended interfaces, and as many as 256 registers can be configured to realize control and management of the instruction pipeline in the core of the processor.

The core of the HC464v processor extends the CSRs by means of the private extended interfaces. Eight groups of address mask registers, 16 registers in total, are configured, each group of address mask registers includes a start address configuration register m_start_addr_x and an end address configuration register m_end_addr_x and is used for defining an address space where a memory access operation can be masked. Wherein, two bit fields data_addr_x_en and ins_addr_x_en are added in the start address configuration register m_start_addr_x to distinguish a program instruction from a data address. The registers m_start_addr_x and m_end_addr_x and bit fields thereof are defined as shown in the following two tables:

| 63 | 41 | 40 | 39 |
|---|---|---|---|
| 0 | data_addr_x_en | ins_addr_x_en | 0 m_start_addr_x | m_start_addr_x register

| 63 | 39 |
|---|---|
| 0 | 0 m_end_addr_x | m_end_addr_x register

The core of the HC464v processor is a 64-bit processor core and supports 64-bit registers and 40-bit physical addresses. When data_addr_x_en is 1, it indicates that a data segment address is effectively masked; when insn_addr_x_en is 1, it indicates that a program segment address is effectively masked; m_start_addr_x [39:0] is a start address of a 40-bit illegal program instruction/data access address to be masked, and m_end_addr_x [39:0] is an end address of the 40-bit illegal program instruction/data access address to be masked.

In the instruction set architecture realized by the HC464v processor, a twenty-first CSR and a twenty-second CSR are reserved items, the functions of the two CSRs are defined by users, and the eight groups of illegal program instruction/data access address mask registers, 16 registers in total, are defined as shown in the following table:

TABLE

Illegal program instruction/data access address mask register groups

| Number of registers | | Name of | |
|---|---|---|---|
| Total Number | Sub-number | registers | Function |
| 21 | 0 | m_start_addr_0 | Start/end address of the zeroth group |
| 21 | 1 | m_end_addr_0 | of program instruction/data mask registers |
| 21 | 2 | m_start_addr_1 | Start/end address of the first group of |
| 21 | 3 | m_end_addr_1 | program instruction/data mask registers |
| 21 | 4 | m_start_addr_2 | Start/end address of the second group |
| 21 | 5 | m_end_addr_2 | of program instruction/data mask registers |
| 21 | 6 | m_start_addr_3 | Start/end address of the third group of |
| 22 | 7 | m_end_addr_3 | program instruction/data mask registers |
| 22 | 0 | m_start_addr_4 | Start/end address of the fourth group |
| 22 | 1 | m_end_addr_4 | of program instruction/data mask registers |
| 22 | 2 | m_start_addr_5 | Start/end address of the fifth group of |
| 22 | 3 | m_end_addr_5 | program instruction/data mask registers |
| 22 | 4 | m_start_addr_6 | Start/end address of the sixth group of |
| 22 | 5 | m_end_addr_6 | program instruction/data mask registers |
| 22 | 6 | m_start_addr_7 | Start/end address of the seventh group |
| 22 | 7 | m_end_addr_7 | of program instruction/data mask registers |

Identical with other CSRs of the HC464v processor, the address mask register group can be accessed only by means of CRS-specific instructions. MFC0/DMFC0-specific instructions are used for reading instructions, and MTC0/DMTC0-specific instructions are used for writing instructions.

Eight groups of illegal address mask registers are defined in total for the HC464v processor, power-on defaults of the registers are 0, that is, eight groups of address ports can be configured at most, and eight physical address spaces can be defined at most; every two registers (m_start_addr_x and m_end_addr_x) are used together to define one physical address space; and after the registers are configured, it indicates that a program instruction/data behavior of the DSP in the address range is cancelled.

During software development of the DSP, an illegal memory access address space range, including address spaces, that have been mapped and not used, corresponding to a slave device, and non-mapped reserved address spaces in an actual application scenario, of the processor is specified first; for program instructions, address spaces other than a memory boot space and a DDR4 are configured as illegal program addresses. In addition, in the initialization process of the uboot program, the start address and the end address of these address spaces need to be written into the address mask register group one by one.

The HC464v processor receives multiple input instructions, including branch jump directions and branch jump offsets of the instructions, by means of multiplexers MUX, combines the instructions and then transmits the instructions to a PC; at the fetch stage of the HC464v processor, a PC pointer is obtained by means of the PC or a jump instruction of a control unit; before the PC pointer reads a program memory, an instruction in the PC pointer is compared with a masked address range of a preset address mask register group by means of a first comparator; if the instruction in the PC pointer is located in the masked address range, the first comparator sends out an illegal address decision signal to control a first gate to block the instruction, such that an illegal address is masked; if the instruction in the PC pointer is not located in the masked address range, the first gate allows the PC pointer to read the program memory, the instruction pipeline enters a pre-decode stage, and four instructions are fetched in one tick and sent to an instruction pre-decoder to pre-decode the types of the instructions to extract a memory access instruction; an address of the memory access instruction is compared with the masked address range of a preset address mask register group by means of a second comparator; if the address of the memory access instruction is located in the masked address range, the second comparator sends out an illegal address decision signal to control a second gate to block the memory access instruction, such that an illegal address is masked; if the address of the memory access instruction is not located in the masked address range, the second gate allows the memory access instruction to enter an instruction decoder, and after being decoded, the instruction is dispatched, issued, executed, written-back in an instruction execution unit, and finally transmitted out by means of an external interface.

According to the illegal address mask method and device for cores of a DSP provided by the invention, an illegal address mask register group is used to mask illegal address respectively at the fetch stage and the pre-decode stage to solve the problem of no response without timeout determination, such that the influence of illegal addresses on transmission is quickly eliminated, and transmission efficiency is guaranteed; in addition, illegal addresses can be found and masked quickly, subsequent invalid operations of instructions are avoided, the transmission overhead of illegal instructions is reduced, and a remarkable improvement is achieved.

Terminology Explanation (1) DDR4: double-data rate fourth-generation synchronous dynamic random access memory, which is a storage medium applied to computers and can provide fast data retrieval and access services for a system and provide a storage space for the system.

(2) Reserved items: specific register or memory addresses, which are reserved in the design, combination and implementation process of a processor to be used for subsequent specific functions or operations.

(3) One tick: one clock period.

(4) CSR: control and status register, which is extendable and used for controlling the function and status in a processor and handling exceptions and interrupts.

(5) MUX: multiplexer, which can combine multiple input instructions/signals into one output instruction/signal to allow multiple instructions/data to share one circuit.

The above embodiments are merely used for explaining the technical concept of the invention and are not intended to limit the protection scope of the invention. Any modifications made based on the technical concept of the invention should also fall within the protection scope of the invention.

What is claimed is:

1. An illegal address mask method for cores of a digital signal processor (DSP), comprising the following steps:
S1, initializing a core of the DSP, comprising: powering on and resetting the core of the DSP;
S2, configuring, in the core of the DSP, a group of illegal address mask registers, comprising a start address register and an end address register, and taking an address range defined by the start address register and the end address register as a masked address range; configuring, in the core of the DSP, a first comparator and a second comparator to send out illegal address decision signals for instructions within the masked address range; configuring, in the core of the DSP, a first gate and a second gate to block or transmit the instructions;
S3, acquiring a program counter (PC) pointer by a PC or a jump instruction, and determining, by the first comparator in S2, whether an address of the PC pointer is located in the masked address range; when the address of the PC pointer is located in the masked address range, sending out a first illegal address decision signal by the first comparator to control the first gate to block the PC pointer so as to stop an operation of the PC pointer, such that a first illegal address is masked; when the address of the PC pointer is not located in the masked address range, controlling the first gate to transmit the PC pointer to perform pre-decoding, wherein the pre-decoding comprises: fetching the instructions from a program memory by the PC pointer to obtain fetched instructions, and transmitting the fetched instructions to an instruction pre-decoder for pre-decoding to obtain an address of a memory access instruction; and
S4, determining, by the second comparator in S2, whether the address of the memory access instruction obtained in S3 is located in the masked address range; when the address of the memory access instruction obtained in S3 is located in the masked address range, sending out a second illegal address decision signal by the second comparator to control the second gate to block the memory access instruction so as to stop an operation of the memory access instruction, such that a second illegal address is masked; when the address of the memory access instruction obtained in S3 is not located in the masked address range, controlling the second gate to transmit the memory access instruction to perform decoding, and completing a memory access operation according to an instruction obtained by decoding.

2. The illegal address mask method for the cores of the DSP according to claim 1, wherein the DSP comprises one core or multiple cores;
when the DSP comprises one core, the core is processed according to S1-S4 of the illegal address mask method; or
when the DSP comprises multiple cores, all the cores are synchronously processed according to S1-S4 of the illegal address mask method.

3. The illegal address mask method for the cores of the DSP according to claim 2, wherein when the DSP comprises multiple cores, if the cores perform identical tasks, identical masked address ranges are set in the cores; or, if the cores perform different tasks, different masked address ranges are set in the cores.

4. The illegal address mask method for the cores of the DSP according to claim 1, wherein in S2, the masked address range comprises non-mapped reversed addresses in the core, and addresses, that have been mapped and not used, corresponding to a salve device in the core.

5. The illegal address mask method for the cores of the DSP according to claim 1, wherein in S2, a method for configuring the group of illegal address mask registers comprises: configuring, in the core of the DSP, two control and status registers (CSRs) as reserved items, and then modifying the two CSRs into the start address register and the end address register respectively.

6. The illegal address mask method for the cores of the DSP according to claim 1, wherein in S3, when the instructions are fetched from the program memory by the PC pointer, a number of the instructions fetched from the program memory is equal to a maximum number of instructions decoded by the core within a clock period.

7. An illegal address mask device for cores of a DSP, comprising:
- a signal input module, comprising a first multiplexer, a PC, a second multiplexer and a controller unit, wherein the first multiplexer receives an external input instruction and a first jump instruction from the control unit and selects a first transmission path to transmit the external input instruction and the first jump instruction to the PC to obtain a PC pointer, and the second multiplexer receives the PC pointer and a second jump instruction from the control unit and selects a second transmission path to transmit the PC pointer and the second jump instruction;
- an illegal address determination module, comprising a first comparator, a first gate, a program memory, an instruction pre-decoder, an illegal address mask register group, a second comparator and a second gate, wherein the first comparator receives an instruction transmitted by the second multiplexer of the signal input module and compares the instruction with a masked address range in the illegal address mask register group; when the instruction transmitted by the second multiplexer is located in the masked address range, the first comparator sends out a first illegal address decision signal to inform the first gate to block the instruction; when the instruction transmitted by the second multiplexer is not located in the masked address range, the first gate transmits the instruction to drive the PC pointer to perform a fetch operation on the program memory; the instruction pre-decoder receives and pre-decodes instructions obtained by the fetch operation to obtain an address of a memory access instruction; whether the address of the memory access instruction is located in the masked address range is determined by the second comparator; when the address of the memory access instruction is located in the masked address range, the second comparator sends out a second illegal address decision signal to control the second gate to block the memory access instruction; when the address of the memory access instruction is not located in the masked address range, the second gate transmits the memory access instruction; and
- a decoding and execution module, comprising an instruction decoder, an instruction execution unit and an external interface, wherein the instruction decoder receives the memory access instruction transmitted by the second gate of the illegal address determination module, extracts contents of the memory access instruction, transmits the contents of the memory access instruction to the instruction execution unit to perform a memory access operation, and after the memory access operation is completed, output is performed by the external interface.

8. The illegal address mask device for the cores of the DSP according to claim 7, wherein the DSP comprises one core or multiple cores;
- when the DSP comprises one core, the core is set according to the signal input module, the illegal address determination module, and the decoding and execution module in claim 7; or
- when the DSP comprises multiple cores, each of the cores is set according to the signal input module, the illegal address determination module, and the decoding and execution module in claim 7.

9. The illegal address mask device for the cores of the DSP according to claim 7, wherein the illegal address mask register group in the illegal address determination module comprises a start address register and an end address register, wherein the start address register and the end address register are extended from two CSRs, and an address range defined by the start address register and the end address register is the masked address range.

* * * * *